United States Patent [19]

Kuroda et al.

[11] Patent Number: 5,239,140

[45] Date of Patent: Aug. 24, 1993

[54] PATTERN INPUT APPARATUS

[75] Inventors: Kazuo Kuroda; Toshio Suzuki, both of Tokorozawa, Japan

[73] Assignee: Pioneer Electronic Corporation, Tokyo, Japan

[21] Appl. No.: 802,035

[22] Filed: Dec. 3, 1991

[30] Foreign Application Priority Data

Mar. 8, 1991 [JP] Japan .................. 3-043263

[51] Int. Cl.$^5$ .............................................. G08C 21/00
[52] U.S. Cl. ........................................ 178/18; 178/19
[58] Field of Search .................. 178/18, 19, 21, 87

[56] References Cited

U.S. PATENT DOCUMENTS 3,644,671  2/1972  Scarbrough ..................... 178/18

Primary Examiner—Stafford Schreyer
Attorney, Agent, or Firm—Keck, Mahin & Cate

[57] ABSTRACT

A pattern input apparatus designed to improve the operational easiness comprises a plurality of contact detecting device, arranged on a detection surface, each for generating a detection signal upon contact with an object. A pattern drawn by the object moving in contact with the detection surface is discriminated, using the locus or the amount of displacement vector of a point located approximately at the center between at least two adjoining ones of the plurality of contact detecting devices on the detection surface, when the detection signals are output from the at least two adjoining ones of the plurality of contact detecting devices.

2 Claims, 11 Drawing Sheets

```
        (C15)(C14)(C13)(C12)(C11)(C10)
          |    |    |    |    |    |
          0    0    0    0    0    0    ------ (L 9)

0    0    0    0    0    0    ------ (L10)

0   16   32   16    0    0    ------ (L11)

0   32   64   32    0    0    ------ (L12)

0   16   32   16    0    0    ------ (L13)

0    0    0    0    0    0    ------ (L14)
```

PATTERN INPUT APPARATUS

BACKGROUND OF THE INVENTION

1. Field of the Invention

The present invention relates to a pattern input apparatus which is used for the input of patterns, such as characters and drawings, into an information processing apparatus.

2. Description of Background Information

An image scanner which reads characters and patterns and the like drawn on a paper is well known as a pattern input apparatus. Also known are an apparatus which has a panel with a plurality of pressure sensors arranged on the same surface, and detects the locus of a pen-like equipment when a user moves the equipment while in contact with the panel, and an apparatus which has a liquid crystal panel and detects the locus of a light pen when a user moves the pen in contact with the panel.

The above-described type conventional apparatuses, however, have a problem of poor operational easiness because characters and patterns have to be drawn on a paper at least once, and a pen-like equipment or a light pen is required.

SUMMARY OF THE INVENTION

It is therefore an object of the present invention to provide a pattern input apparatus which has an improved operational easiness.

A pattern input apparatus according to one aspect of the present invention comprises a plurality of contact detecting means, arranged on a detection surface, each generating a detection signal upon contact with an object; and pattern discriminating means for discriminating a pattern drawn by the object moving in contact with the detection surface, using a locus or an amount of displacement vector of a point located approximately at the center between at least two adjoining ones of the plurality of contact detecting means on the detection surface, when the detection signals are output from the at least two adjoining ones of the plurality of contact detecting means.

A pattern input apparatus according to another aspect of the present invention comprises a plurality of contact detecting means, arranged on a detection surface, each for generating a detection signal upon contact with an object; and pattern discriminating means for discriminating a pattern drawn by the object moving in contact with the detection surface, using an evaluation function acquired by weighting the detection signal in accordance with distances from a point located approximately at the center, on the detection surface, between at least two adjoining ones among the contact detecting means to the at least two adjoining contact detecting means, when the detection signals are output from the at least two adjoining ones of the plurality of contact detecting means.

In the pattern input apparatus according to the present invention, a pattern drawn by an object is discriminated by the locus or the amount of the displacement vector of a point located approximately at the center of the contact face where the object is in contact with the detection surface.

In another pattern input apparatus according to the present invention, weighting of the detection signal is performed according to the distance from the approximate center of the contact face where the object is in contact with the detection surface to provide an evaluation function, and a pattern of the moving object is discriminated using the acquired evaluation function.

DETAILED DESCRIPTION OF THE PREFERRED EMBODIMENTS

Preferred embodiments of the present invention will now be described referring to the accompanying drawings.

Figure 1:
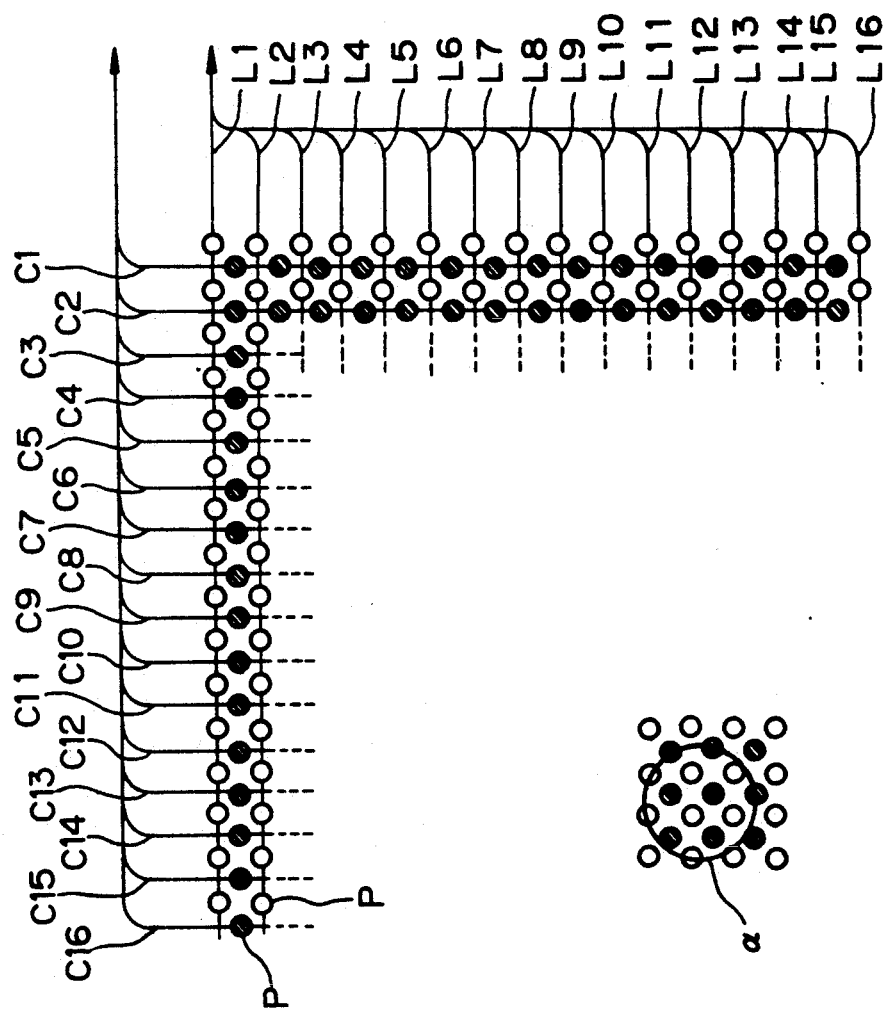
FIG. 1 is a circuit diagram illustrating one embodiment of the present invention.

As shown in FIG. 1, there are sixteen first signal lines C1 to C16 extending in parallel with one another and sixteen parallel second signal lines L1 to L16 extending perpendicular to the first signal lines C1 to C16. Two sets of sixteen touch plates P made of conductive metal are arranged at predetermined spacings and are respectively connected to the first signal lines C1 to C16 and the second signal lines L1 to L16.

The white circles in FIG. 1 represent the touch plates connected to the associated second signal lines L1 to L16, while the shaded circles represent the touch plates connected to the associated first signal lines C1 to C16.

When a user's finger simultaneously touches at least two adjoining touch plates among 512 touch plates P in total on a touch sensor panel shown in FIG. 1, by the power electric induction of 50/60 Hz of the human body, an AC voltage of 50 Hz or 60 Hz is induced on at least one of the first signal lines C1 to C16 and at least one of the second signal lines L1 to L16. The induced AC voltage on at least one of the first signal line C1 to C16 is output as a signal indicating a finger contact point in the direction X on the touch sensor panel. The other induced AC voltage on at least one of the second signal lines L1 to L16 is sent as a signal indicating a finger contact point in the direction Y on the touch sensor panel.

Figure 2:
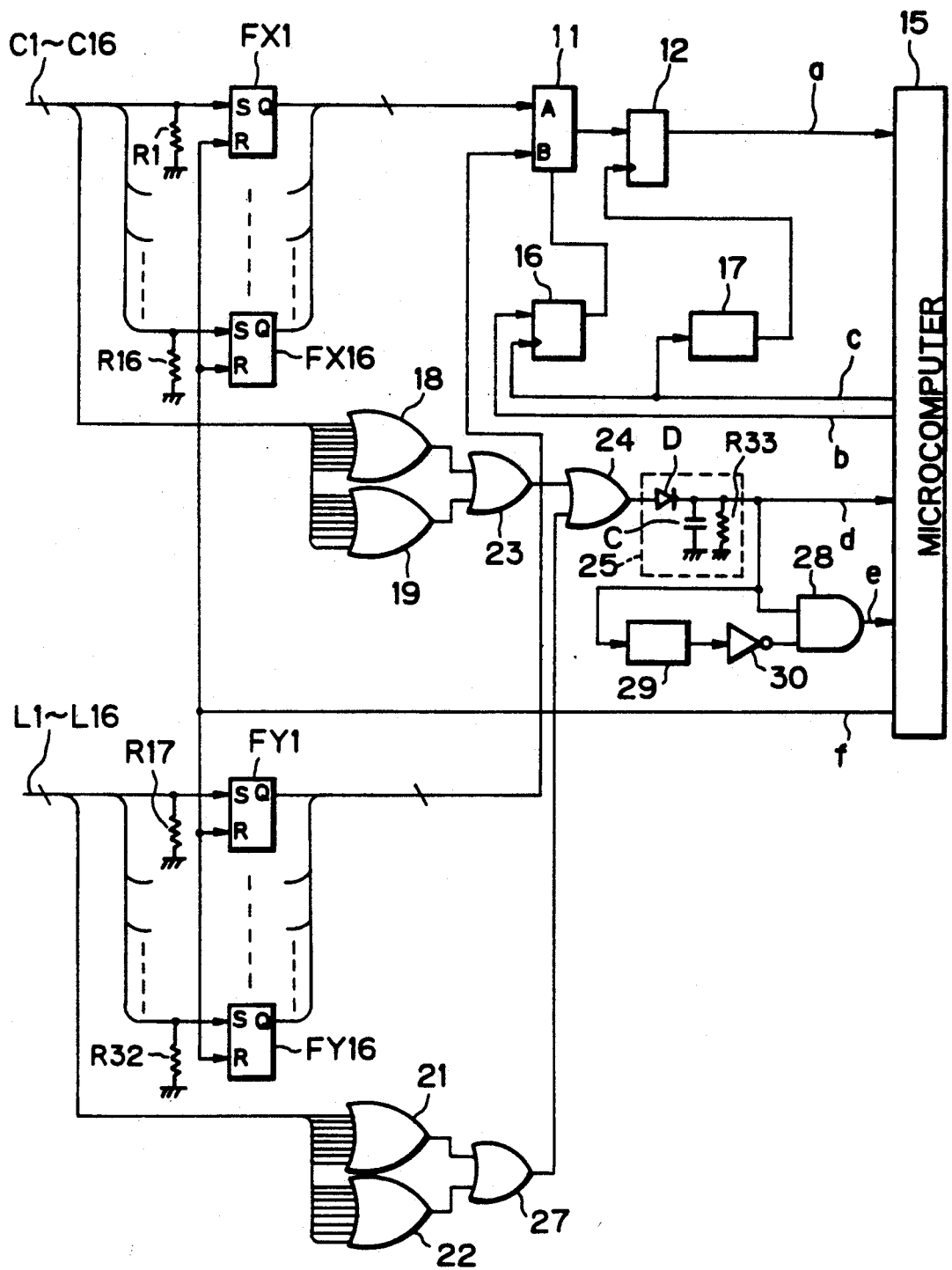
FIG. 2 is a circuit block diagram of the embodiment of the present invention.

FIG. 2 is a circuit block diagram of a pattern discriminating circuit which discriminates a pattern drawn as the user's finger moves on the touch sensor panel shown in FIG. 1 while in contact therewith. In FIG. 2, the voltages induced on the individual first signal lines C1 to C16 are supplied respectively to set input terminals of sixteen RS flip-flops FX1 to FX16. The voltages induced on the individual second signal lines L1 to L16 are supplied respectively to set input terminals of sixteen RS flip-flops FY1 to FY16. A reset signal f is sent from a microcomputer 15 to reset input terminals of the flip-flops FX1 to FX16 and FY1 to FY16.

Thirty-two resistors R1 to R32 are connected between the ground and the set input terminals of the flip-flops FX1 to FX16 and the flip-flops FY1 to FY16, respectively. The resistances of these resistors R1 to R32 are 4.7 MΩ, for example. The Q outputs of the flip-flops FX1 to FX16 are sent to an input terminal A of a signal selector 11. The Q outputs of the flip-flops FY1 to FY16 are likewise sent to an input terminal B of the signal selector 11. When the signal selector 11 receives a control signal of a high level for example, the selector 11 selectively outputs the signals received at the input terminal A. The signal selector 11 selectively outputs the signals received at the input terminal B when the control signal is of a low level for example. The output from the signal selector 11 is sent to a 16-bit latch circuit 12, whose output is data input a to the microcomputer 15. The output of a 1-bit latch circuit 16 is supplied as the control signal to the signal selector 11. The 1-bit latch circuit 16 has a data input terminal to receive a select signal b from the microcomputer 15, and a clock input terminal to receive a latch pulse c also from the microcomputer 15. The latch pulse c is then delayed by a time T1 by a delay circuit 17 to be supplied to the clock input terminal of the 16-bit latch circuit 12.

The induced voltages on the first signal lines C1 to C8 are supplied to an 8-input OR gate 18, while the induced voltages on the signal lines C9 to C16 are sent to an 8-input OR gate 19. Likewise, the induced voltages on the second signal lines L1 to L8 are supplied to an 8-input OR gate 21, while the induced voltages on the signal lines L9 to L16 are sent to an 8-input OR gate 22. Both outputs of the 8-input OR gates 18 and 19 are supplied via 2-input OR gates 23 and 24 to a time constant circuit 25 including a diode D, a resistor R33 and a capacitor C. Both outputs of the 8-input OR gates 21 and 22 are supplied via 2-input OR gates 27 and 24 to the time constant circuit 25.

The output from the time constant circuit 25 is sent as a ready signal d to the microcomputer 15. This output is also sent to one input terminal of an AND gate 28 as well as a delay circuit 29 where it is delayed by a time T2. The output of the delay circuit 29 is sent via an invertor 30 to the other input terminal of the AND gate 28. The output from the AND gate 28 is supplied as an interrupt signal e to the microcomputer 15.

The microcomputer 15, which comprises a processor, a ROM, a RAM and an I/O port, processes the input data a in accordance with a program previously stored in the ROM, and discriminates a character or a pattern corresponding to the pattern drawn by the user's finger moving in contact with the touch sensor panel.

Figure 3:
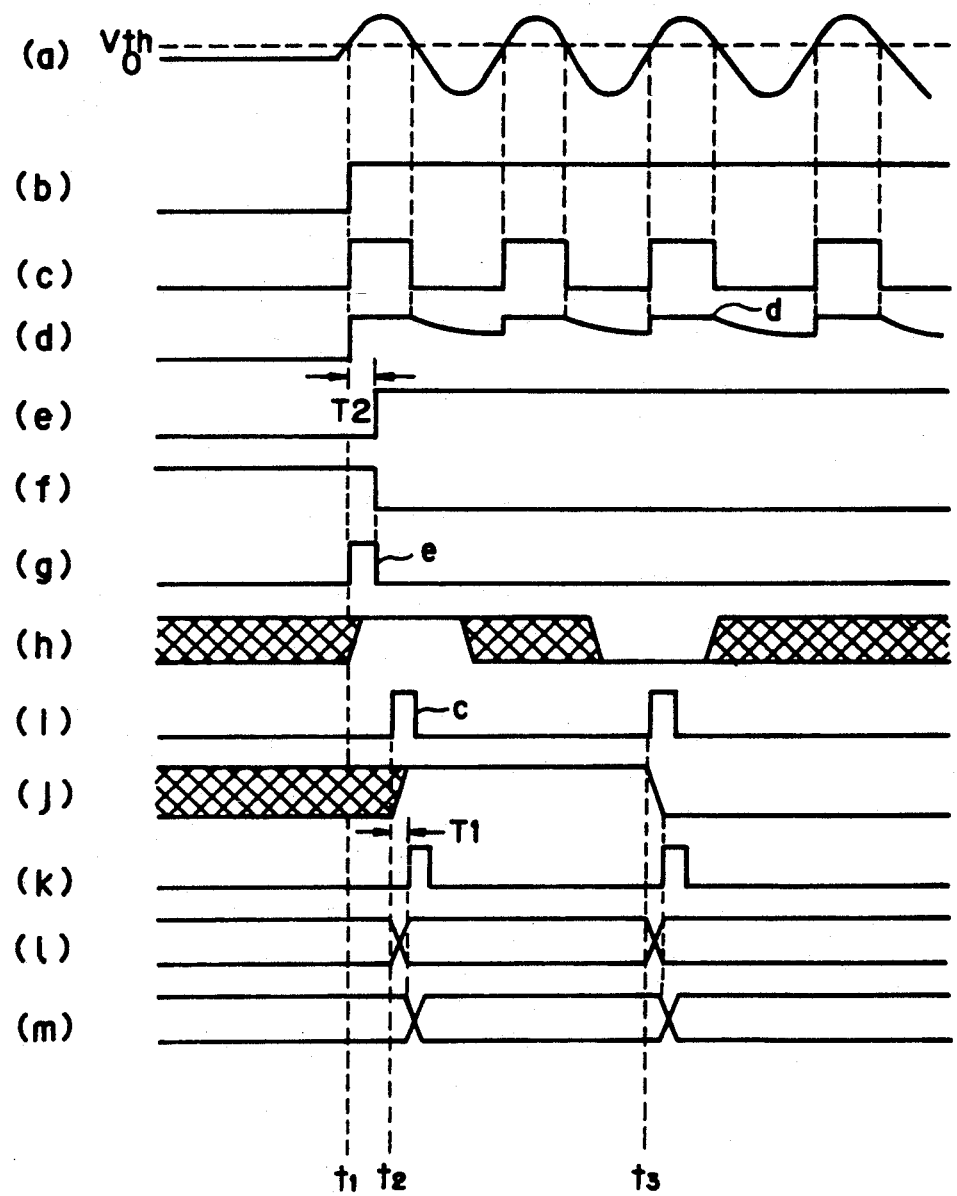
FIGS. 3 to 7 are waveform charts showing the operations of the individual sections of the pattern input apparatus shown in FIGS. 1 and 2.

The operations of the individual sections of the thus-constituted apparatus will now be described referring to timing charts in FIG. 3 and flowcharts in FIGS. 4 to 7. In FIG. 3, (a) shows the waveform of the voltage induced on each of first and second signal lines C1 to C16 and L1 to L16. The chart (b) represents the waveform of the output Q of each of the flip-flops FX1 to FX16 and FY1 to FY16. The charts (c), (d), (e) and (f) illustrate the waveforms respectively of the output of the OR gate 24, the ready signal d from the time constant circuit 25, the output of the delay circuit 29, and the output of the invertor 30. The charts (g), (h) and (i) respectively present the waveforms of the interrupt signal e from the AND gate 28, the select signal b, and the latch pulse c. The charts (j), (k), (l) and (m) respectively show output waveforms of the latch circuit 16, the delay circuit 17, the signal selector 11, and the latch circuit 12.

At a time t1, when the user's finger touches a circle α on the touch sensor panel shown in FIG. 1, the 50/60 Hz power electric induction of the human body induces an AC voltage of 50 Hz or 60 Hz to the first signal lines C12 to C14 among those C1 to C16 and the second signal lines L11 to L13 among those L1 to L16. In a positive half cycle of the AC voltage, the voltages at the set input terminals of the individual flip-flops FX12 to FX14 and FY11 and FY13 become equal to or greater than a threshold level Vth to set these flip-flops FX12 to FX14 and FY11 to FY13, thus setting the output Q to a high level. The output of the 2-input OR gate 24 becomes high at the same time, causing the output of the time constant circuit 25 to spontaneously rise to a high level. As a result, a high-level ready signal d, which indicates that the user's finger is in contact with the touch sensor panel, is supplied to the microcomputer 15. When the output of the 2-input OR gate 24 drops to a low level, the output of the time constant circuit 25 gradually falls to a low level over a period corresponding to a time constant determined by the capacitor C and the resistor R32.

Having been delayed by the time T2 in the delay circuit 29, the ready signal d is supplied via the invertor 30 to one input terminal of the AND gate 28 wherein a logical product is generated with the ready signal d which has been sent directly at the other input terminal. Then, the AND gate 28 outputs a pulse with a time length T2 in synchronism with the leading edge of the ready signal d, and this pulse is supplied as an interrupt signal e to the microcomputer 15.

Figure 4:
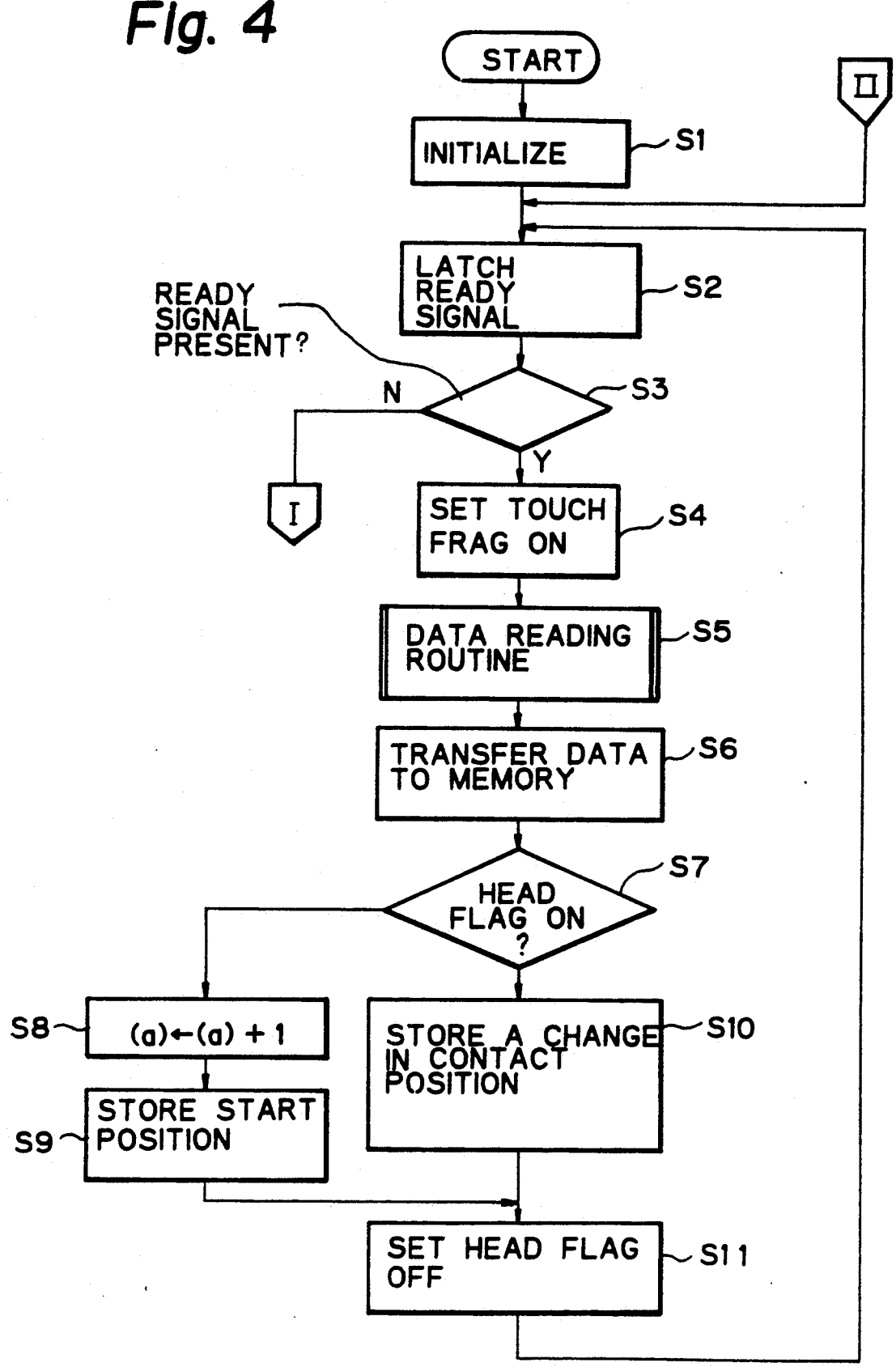
Figure 5:
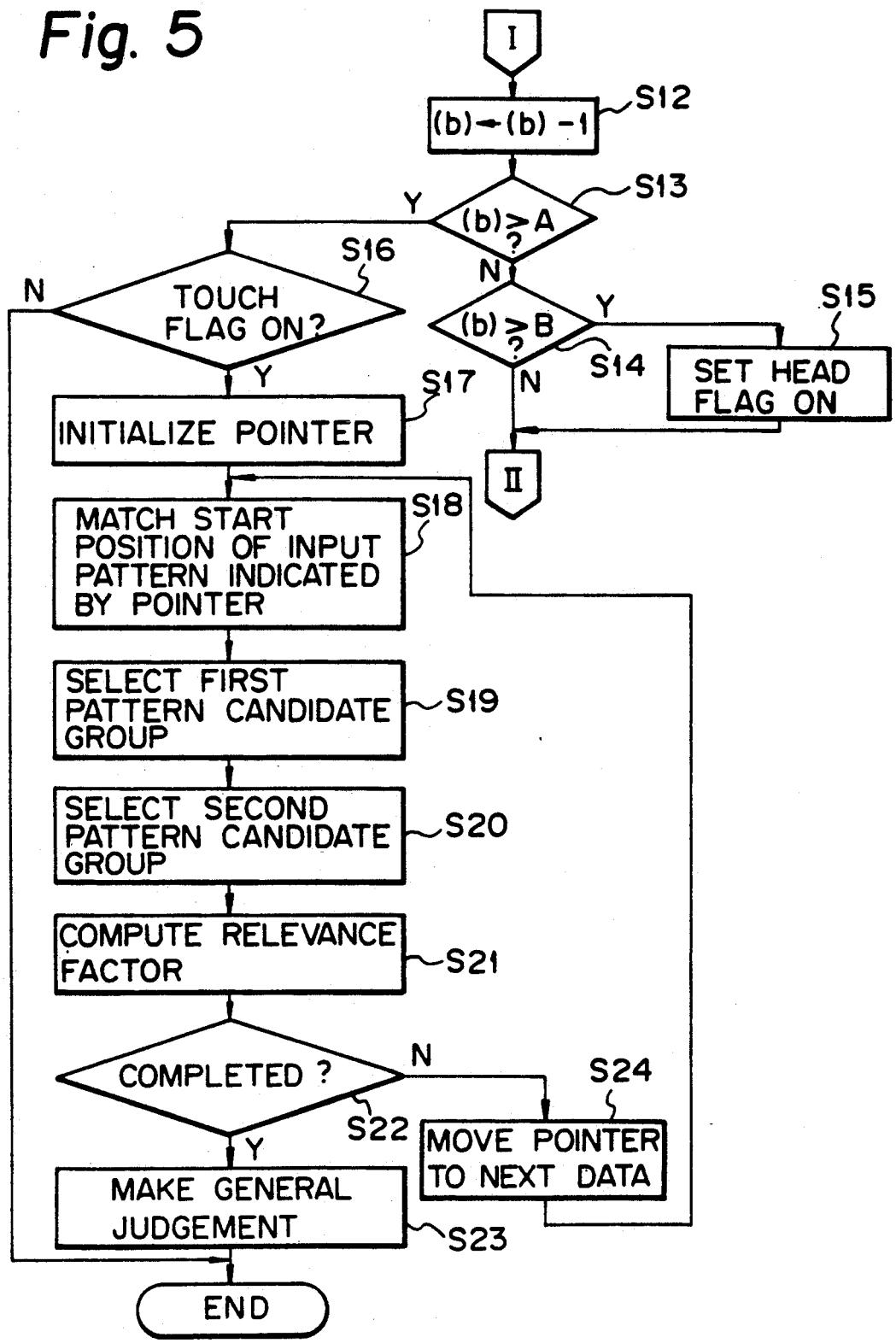

In response to the interrupt signal e, the microcomputer 15 starts executing the subroutine shown in FIGS. 4 and 5. In other words, in response to the interrupt signal e, the processor of the microcomputer 15 sets a head flag on, and a touch flag off for initialization (step S1). The processor then performs an operation to latch the ready signal d (step S2), and determines whether or not the ready signal d exists (step S3). When it is determined in step S3 that no ready signal d exists, the processor advances to step S12 which will be described later. If the judgment in step S3 is such that the ready signal d is present, the processor sets the touch flag on (step S4) and executes a data reading routine (step S5).

Figure 6:
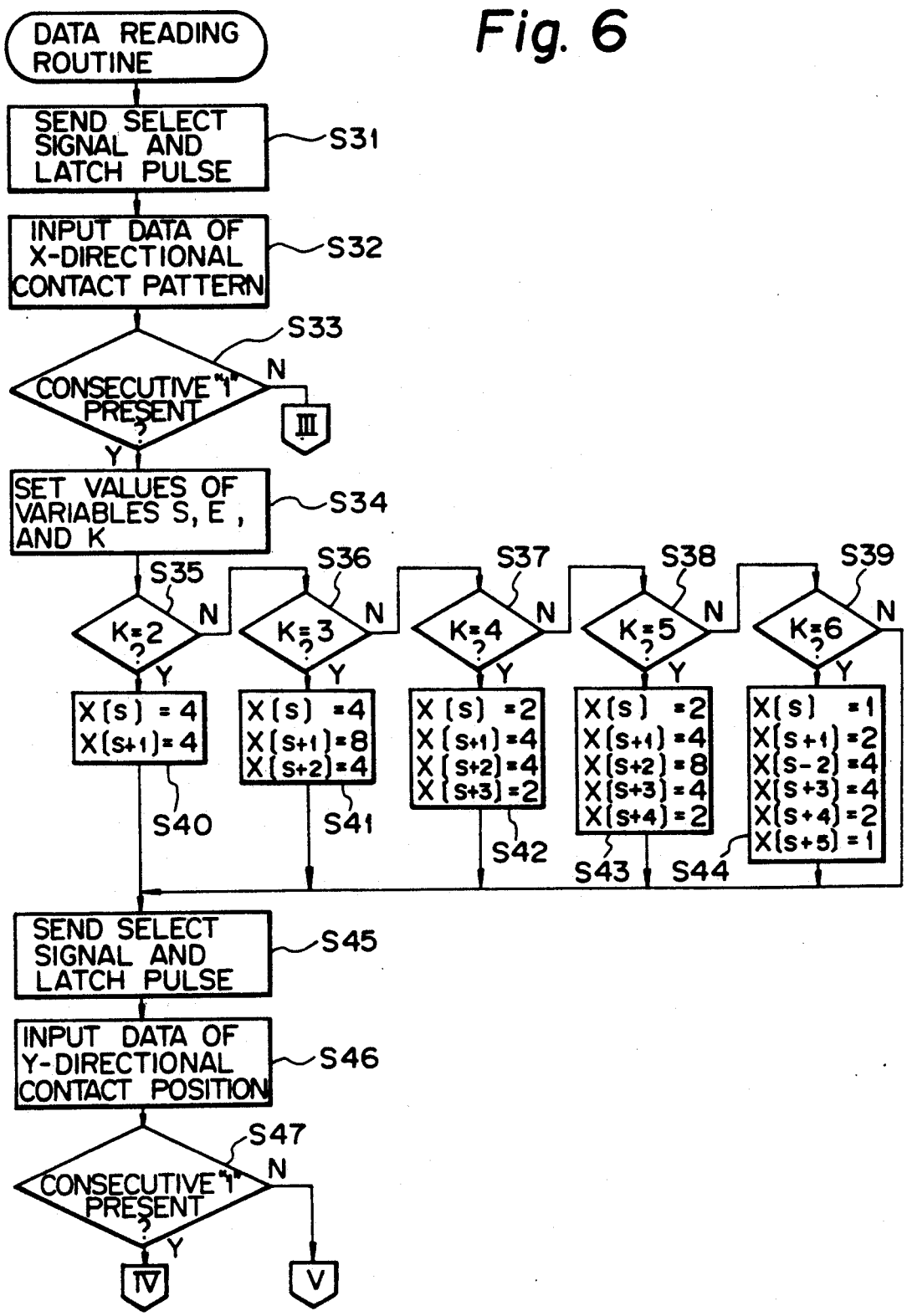
Figure 7:
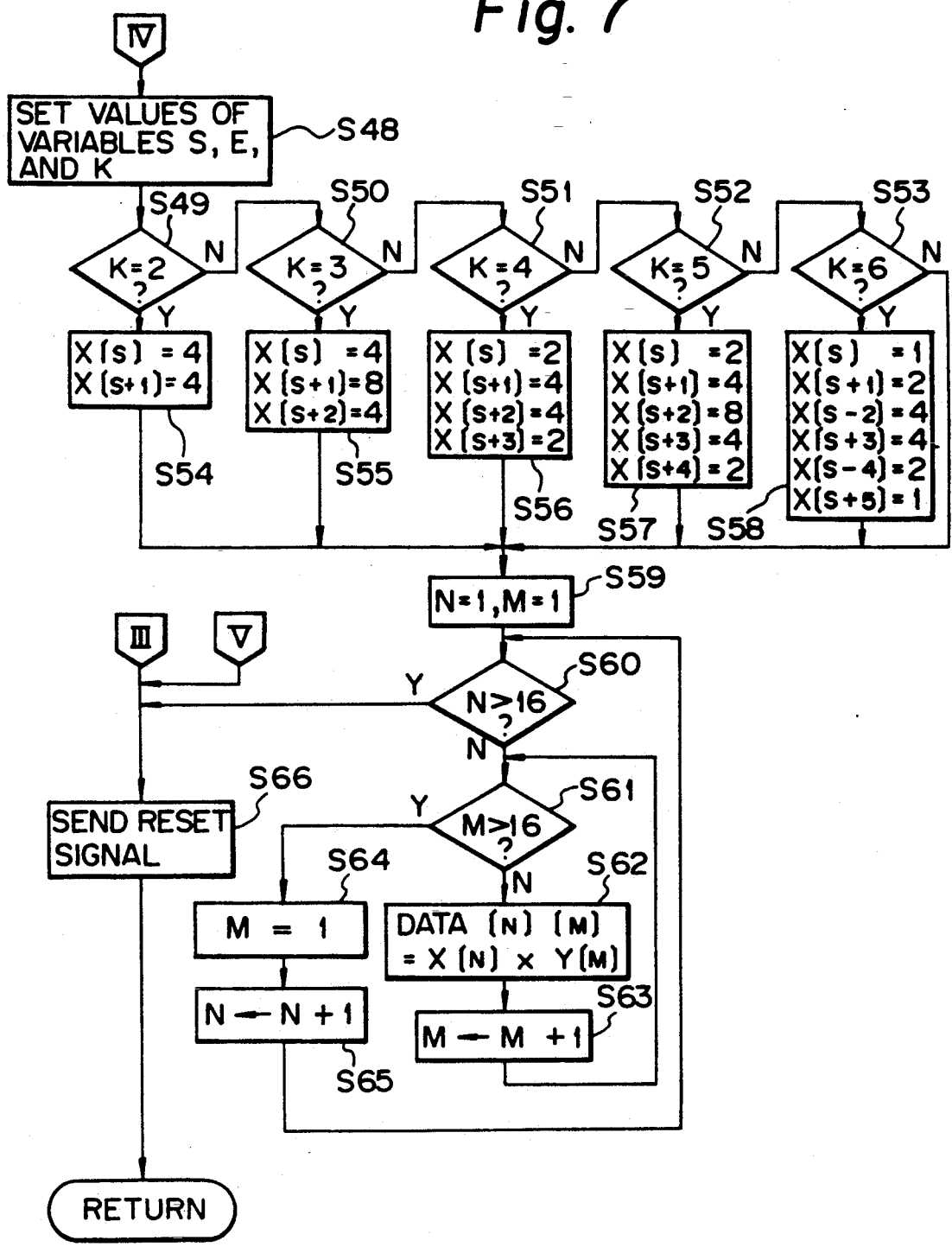

In the data reading routine, the processor transmits a high-level select signal b and a latch pulse c, as shown in FIGS. 6 and 7 (step S31). When the latch pulse c is output in step S31 (time t2), the high-level select signal b is held in the 1-bit latch circuit 16, and a high-level control signal is supplied to the signal selector 11, which then selectively sends the outputs Q of the flip-flops FX1 to FX16 to the 16-bit latch circuit 12. The latch pulse c is delayed by the time T1 in the delay circuit 17 and is then sent to the clock input terminal of the 16-bit latch circuit 12. Consequently, the outputs Q of the flip-flops FX1 to FX16 are held in the 16-bit latch circuit 12 after the time T1 has passed since the time t2, and are supplied to the microcomputer 15 as bits of data representing the contact position of the finger in the direction X.

After executing the process in step 31, the processor of the microcomputer 15 latches data indicating the contact position of the finger in the direction X (step S32) and then determines whether the latched data has consecutive bits of "1" (high level) (step S33). If it is not judged in step S33 that such consecutive bits are present, the processor advances to step S66 to be described later. If the judgment is made in step S33 that the consecutive bits are present, the processor sets a variable S to the value of the least significant bit in the consecutive bits, a value E to the value of the most significant bit, and a variable K to (E−S+1) (step S34).

After execution of the process in step S34, the processor determines successively whether or not the variable K is equal to each of "2" through "6" (steps S35 to S39).

Evaluated values at positions associated with 16 individual bits which form data indicating the contact position of the finger in the direction X are denoted by X[1] to X[16].

When it is judged in steps S35 through S39 that the variable K is equal to "2", the processor sets X[S] to "4", and X[S+1] to "4" (step S40). When it is judged that the variable K is equal to "3", the processor sets both X[S] and X[S+2] to "4", and X[S+1] to "8" (step S41). When it is judged that the variable K is equal to "4", the processor sets both X[S] and X[S+3] to "2", and X[S+1] and X[S+2] to "4" (step S42). When it is judged that the variable K is equal to "5", the processor sets both X[S] and X[S+4] to "2", X[S+1] and X[S+3] to "4", and X[S+2] to "8" (step S43). When it is judged that the variable K is equal to "6", the processor sets X[S] and X[S+5] to "1", X[S+1] and X[S+4] to "2", and X[S+2] and X[S+3] to "4" (step S44).

When the judgment is made that the variable K is equal to none of the numerals "2" to "6", or after any one of steps S40 to S44 is performed, the processor sends the select signal b of a low level and the latch pulse c (step S45).

When the latch pulse c is output in step S45 (time t3), a low-level select signal b is held in the 1-bit latch circuit 16, and a low-level control signal is supplied to the signal selector 11, which in turn selectively sends the outputs Q from the flip-flops FY1 to FY16 to the 16-bit latch circuit 12. The latch pulse c is delayed by the time T1 in the delay circuit 17 and is sent to the clock input terminal of the 16-bit latch circuit 12. As a result, the outputs Q of the flip-flops FY1 to FY16 are held in the 16-bit latch circuit 12 after the time T1 has passed since a time t3 and are supplied to the microcomputer 15 as bits of data representing the contact position of the finger in the direction Y.

After execution of step 45, the processor of the microcomputer 15 latches data indicating the contact position of the finger in the direction Y (step S46) and then determines whether the latched data has consecutive bits of "1" (high level) (step S47). If it is not judged in step S47 that such consecutive bits are present, the processor advances to step S66 which will be described later. If the judgment in step S47 is such that the consecutive bits are present, the processor sets the variable S to the value of the least significant bit in the consecutive bits, the value E to the value of the most significant bit, and the variable K to (E−S+1) (step S48).

After execution of step S48, the processor determines successively whether or not the variable K is equal to each of "2" through "6" (steps S49 through S53).

Evaluated values at positions associated with 16 individual bits which form data indicating the contact position of the finger in the direction Y are denoted by Y[1] to Y[16].

When it is judged in steps S49 through S53 that the variable K equals "2", the processor sets Y[S] to "4", and Y[S+1] to "4" (step S54). When it is judged that the variable K equals "3", the processor sets both Y[S] and Y[S+2] to "4", and Y[S+1] to "8" (step S55). When it is judged that the variable K equals "4", the processor sets both Y[S] and Y[S+3] to "2", and Y[S+1] and Y[S+2] to "4" (step S56). When it is judged that the variable K equals "5", the processor sets both Y[S] and Y[S+4] to "2", Y[S+1] and Y[S+3] to "4", and Y[S+2] to "8" (step S57). When it is judged that the variable K equals "6", the processor sets Y[S] and Y[S+5] to "1", Y[S+1] and Y[S+4] to "2", and Y[S+2] and Y[S+3] to "4" (step S58).

When it is judged that the variable K is equal to none of the numerals "2" through "6", or after the process in one of steps S40 through S44 is performed, the processor sets N and M to "1" (step S59) and determines if N is greater than "16" (step S60). If N is judged to be greater than "16" in step S60, the processor sends a reset signal f (step S66), terminating the data reading routine. When judging in step S60 that N is not greater than "16", the processor then determines if M is greater than "16" (step S61). When M is not judged to be greater than "16" in step S61, the processor sets data [N] [M] to X[N]×Y[M](step S62).

The data [N] [M] is a general evaluated value of each position on the touch sensor panel shown in FIG. 1.

After executing the operation in step S62, the processor adds "1" to M (step S63), and then returns to step S61. When judging in step S61 that M is greater than "16", the processor sets M to "1" (step S64), adds "1" to N (step S65), and then returns to step S60.

Figures 8, 9:
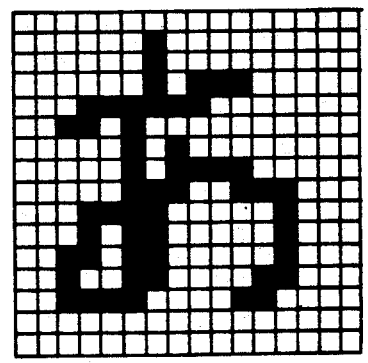
FIG. 8 is a diagram illustrating a contact distribution.
FIG. 9 is a diagram showing a pattern of the locus of the center of the contact position of a finger.

Through the above data reading routine, when an AC voltage is induced, for example, on the first signal lines C12 to C14 and the second signals lines L11 to L13, X[12]=4, X[13]=8, and X[14]=4 while Y[11]=4, Y[12]=8 and Y[13]=4, thus yielding the contact distribution according to general evaluated values as shown in FIG. 8.

After executing step S5, the processor transfers data representing the general evaluated value of each position on the touch sensor panel, acquired in the data reading routine, to a predetermined area in the RAM. When there already exists a general evaluated value stored in the RAM, this value or the newly obtained value, whichever is greater, is stored this time (step S6). Then, the processor determines if the head flag is judged to be ON (step S7). If the head flag is judged to be ON in step S7, the processor adds "1" to a count value (a) (step S8), and stores the center position of the contact face as the start position in the RAM (step S9). When it is not judged in step S7 that the head flag is ON, the processor stores the difference between the current value of the center position of the contact face and the previous value into the RAM (step S10). After executing the operation in step S9 or step S10, the processor turns the head flag OFF (step S12), and returns to step S2.

The count value (a), which is incremented in step S8, indicates the number of elements of a character; for example, this number is "3" for し, a phonetic letter of Japanese language. In step S9 or S10, the center position of the contact face is a position corresponding to a value obtained by rounding down a value below the decimal part acquired from an equation: (a value corresponding to one end position of the contact face + a value corresponding to the other end position thereof)/2. In other words, when the AC voltage is induced, for example, on the first signal lines C12 through C14 and the second signals lines L11 through L13, the center position of the contact face in the direction X will be a position corresponding to C13 from (12+14)/2=13, and the center position in the direction Y will be a position corresponding to L12 from (11+13)/2=12.

When it is judged in step S3 that no ready signal d is present, the processor adds "1" to a count value (b) (step S12), and determines if the count value (b) is greater than A (step S13). When the count value (b) is not judged to be greater than A, the processor determines if the count value (b) is greater than B (Step S14). When it is judged in step S14 that the count value (b) is greater than B, the processor sets the head flag ON (step S15), and returns to step S2. When it is judged in step S14 that the count value (b) is not greater than B, the processor immediately returns to step S2. When it is judged in step S13 that the count value (b) is greater than A, the processor then determines whether or not the touch flag is ON (step S16).

The count value (b), which is incremented in step S12, indicates a period of time during which the user's finger is in contact with the touch sensor panel. In step S13 or S14, when (b)>A, it is considered that no data input by the finger has been made for a long period of time and that one character has been input completely, when A>(b)>B, it is considered that displacement between elements of a character has occurred, and when B>(b), it is considered that the finger is still in contact even if the finger has moved off the panel for an instant.

Figure 10:
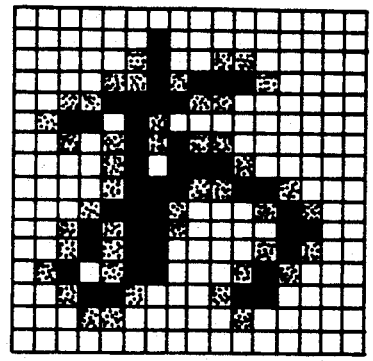
FIG. 10 is a diagram illustrating the contact distribution.

Through these steps S1 to S15, a pattern of the locus of the center of the contact position of the finger as shown in FIG. 9 and a contact distribution according to the general evaluated values as shown in FIG. 10 are stored in the RAM.

When it is judged in step S16 that the touch flag is not ON, the processor resumes the execution of whatever routine it has been executing immediately before moving to step S1. When it is judged in step S16 that the touch flag is ON, the processor initializes a value called a pointer that indicates an address in the RAM to a value corresponding to the address where the first element of the input pattern is stored (step S17). Then, the processor computes the end position and moving direction of a reference pattern at the time the start position of every reference pattern stored in advance in the ROM is set to the start position of the input pattern stored at the address indicated by this pointer (step S18). Then, the processor selects those of the whole reference patterns stored in advance in the ROM whose end positions acquired by the computation in step S18 match with the end position of the input pattern to form a first candidate pattern group (step S19), and selects those of the whole reference patterns stored in the ROM whose moving directions acquired by the computation in step S18 match with the moving direction of the input pattern to form a second candidate pattern group (step S20). Then, the processor selects those reference patterns which belong to both the first and second candidate pattern groups to form a third candidate pattern group, and compares the input pattern with the data for each pattern in the third candidate pattern group to compute the relevance factor (step S21).

Figure 11:
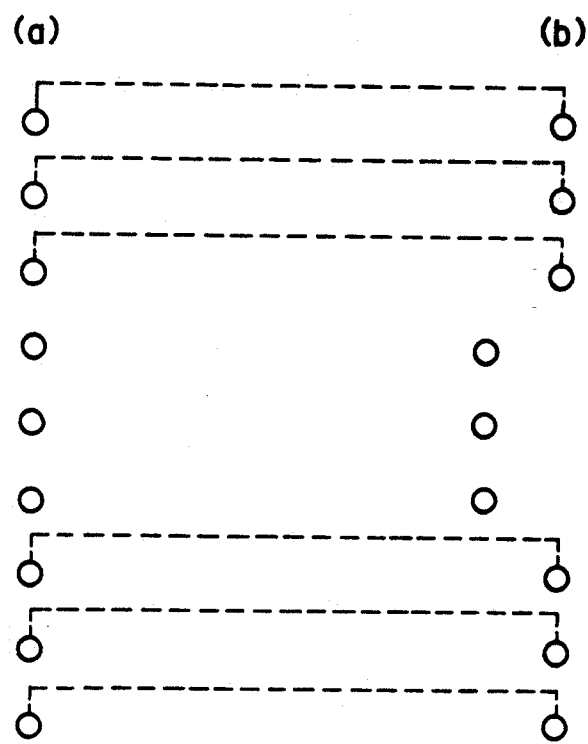
FIGS. 11 and 12 are diagrams illustrating a method for computing a relevance factor of an input pattern to a reference pattern.

The relevance factor of the input pattern to the reference pattern in step S21 is the ratio of the sum of values acquired by multiplying evaluated values of corresponding positions after position matching between the start positions of both patterns to the sum of squares of the evaluated values of the individual positions of the reference pattern. In other words, if the pattern of the locus of the center of the finger contacting position as shown in FIG. 11, (a) is obtained as the input pattern of the left-hand portion of the character , with the evaluated value of the mark "o" being "8", the relevance factor of this input pattern to the reference pattern shown in FIG. 11, (b) will be $8\times8\times6/8\times8\times9=67\%$. In FIG. 11, the broken lines indicate corresponding positions.

Figure 12:
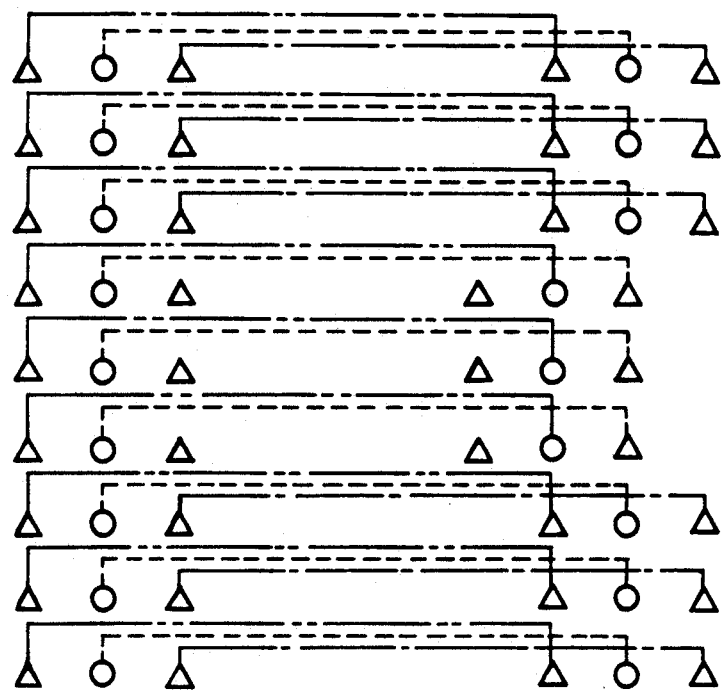

With the contact distribution taken into consideration, i.e., when the contact distribution as shown in FIG. 12, (a) is obtained as the input pattern of the left-hand portion of the character , with the evaluated value of the mark "o" being "8" and that of the mark "Δ" being "4", the relevance factor of this input pattern to the reference patterns shown in FIG. 11, (b) will be 89%. The discrimination ratio is therefore improved when the contact distribution is taken into consideration. In FIG. 12, the broken lines, the alternate long and short dashes and the alternate long and two short dashes indicate corresponding positions.

After executing step S21, the processor determines, using the count value (a), whether or not the computation of the relevance factor of every element of the input pattern to the reference patterns has completed (step S22). When it is judged in step S22 that this computation has completed, the processor selects that pattern in the third candidate pattern group which has the highest relevance factor to specify the input pattern (step S23), and resumes the execution of the routine it has been executing immediately before moving to step S1. When it is judged in step S22 that the computation of the relevance factor of every element of the input pattern to the reference patterns has not completed, the processor changes the pointer that indicates an address in the RAM to a value that indicates the address where data about the next element of the input pattern is stored in order to process the next element for the input pattern (step S24) before returning to step S18.

Figure 13:
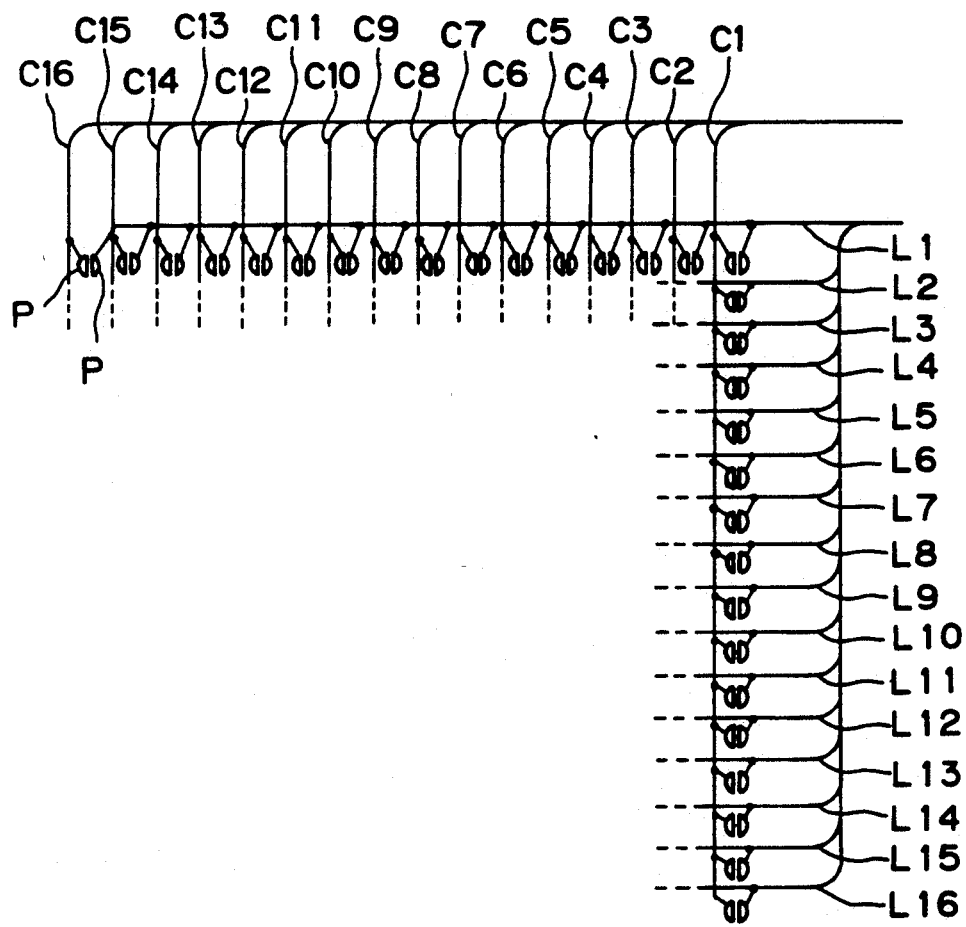
FIG. 13 is a circuit diagram illustrating another embodiment of the present invention.

FIG. 13 shows another example of the touch sensor panel. In FIG. 13 sixteen first signal lines C1 through C16 and sixteen second signal lines L1 through L16 are arranged in the same way as shown in FIG. 1. In this example, however, the shape of the touch plates P respectively connected to the first and second signal lines C1 through C16 and L1 through L16 is semicircular so that the linear portion of the touch plate P connected to each of the first signal lines C1 through C16 faces the linear portion of the associated touch plate P connected to each of the second signal lines L1 through L16. With this structure also, the same action as done by the one shown in FIG. 1 would take place.

While the touch sensor panel in the above embodiment is of an electric induction type, a scan type touch sensor panel may also be used. In this case the drive output of a dynamic encoder may be supplied to either the first signal line or the second signal line, and the sensor output of the dynamic encoder may be supplied to the microcomputer 15, with a signal induced on the other signal line as a sensor input of the dynamic encoder.

As described above, according to the pattern input apparatus embodying the present invention, a pattern drawn by an object is discriminated by the locus or the amount of displacement vector of the point located approximately at the center of the contact face where the object is in contact with the detection surface and, therefore, the area of the detection surface can be made smaller relative to the area of the contact face, thus contributing to make the apparatus compact. Even when the area of the detection surface is relatively small, a pattern can be input without using a device such as a pen, thus improving the operational easiness of the apparatus.

In another pattern input apparatus according to the present invention, weighting is performed in accordance with the distance from the approximate center of the contact face where the object is in contact with the detection surface to improve the accuracy in the computation of the relevance factor of an input pattern drawn by the object to the reference patterns, thus ensuring more accurate discrimination of the pattern drawn by the object.

What is claimed is:

1. A pattern input apparatus comprising:
   a plurality of contact detecting means, arranged on a detection surface, each generating a detection signal upon contact with an object; and
   pattern discriminating means for discriminating a pattern drawn by the object moving in contact with said detection surface, using one of a locus or an amount of a displacement vector of a point located approximately at the center of the contact by the object with said detection surface between at least two adjoining ones of said contact detecting means on said detection surface, where said detection signals are generated by said at least two adjoining ones of said plurality of contact detecting means.

2. A pattern input apparatus comprising:
   a plurality of contact detecting means, arranged on a detection surface, each generating a detection signal upon contact with an object; and
   pattern discriminating means for discriminating a pattern drawn by the object moving in contact with said detection surface, using an evaluation function acquired by weighting said detection signals in accordance with distances from a point located approximately at the center of the contact by the object with said detection surface, of at least two adjoining ones of said contact detecting means, where said detection signals are generated by said at least two adjoining ones of said plurality of contact detecting means.

* * * * *